United States Patent
Skingle (10) Patent No.: US 12,289,297 B2
(45) Date of Patent: Apr. 29, 2025

(54) SECURE DATABASE WITH USER-DEFINED SCHEMAS

(71) Applicant: SYMPHONY COMMUNICATION SERVICES HOLDINGS LLC, Palo Alto, CA (US)

(72) Inventor: Bruce Skingle, Cambridge (GB)

(73) Assignee: SYMPHONY COMMUNICATION SERVICES HOLDINGS LLC, Palo Alto, CA (US)

( * ) Notice: Subject to any disclaimer, the term of this patent is extended or adjusted under 35 U.S.C. 154(b) by 214 days.

(21) Appl. No.: 17/734,575

(22) Filed: May 2, 2022

(65) Prior Publication Data

US 2022/0360570 A1    Nov. 10, 2022

Related U.S. Application Data (60) Provisional application No. 63/183,910, filed on May 4, 2021.

(51) Int. Cl.
*H04L 9/40* (2022.01)
*G06F 16/21* (2019.01)
*G06F 16/28* (2019.01)

(52) U.S. Cl.
CPC ........ *H04L 63/0435* (2013.01); *G06F 16/212* (2019.01); *G06F 16/284* (2019.01)

(58) Field of Classification Search
CPC ... H04L 63/0435; H04L 63/04; G06F 16/212; G06F 16/284
USPC ........................................................ 713/168
See application file for complete search history.

(56) References Cited

U.S. PATENT DOCUMENTS

| 7,788,227 B1 | 8/2010 | Nettleton et al. |
| 2005/0251533 A1* | 11/2005 | Harken ................ G06F 40/143 |
| 2008/0098212 A1* | 4/2008 | Helms ................ H04N 21/2351 |
| | | 713/155 |

(Continued)

FOREIGN PATENT DOCUMENTS

WO    WO-2019144400    8/2019

OTHER PUBLICATIONS

International Search Report and Written Opinion for International Patent Application No. PCT/US2022/027271, dated Aug. 12, 2022 (10 pages).

*Primary Examiner* — Kuen S Lu
(74) *Attorney, Agent, or Firm* — Goodwin Procter LLP (57) ABSTRACT

Systems and methods are described for providing secure communications among users from different organizations. An example method includes: providing a communication service to (i) a first group of users from a first organization having a first computing environment and (ii) a second group of users from a second organization having a second computing environment; creating a data storage schema in the first computing environment; encrypting the data storage schema using an encryption key in the first computing environment; sending the encrypted data storage schema from the first computing environment to a cloud storage infrastructure; receiving the encrypted data storage schema from the cloud storage infrastructure in the second computing environment; decrypting the data storage schema using the encryption key in the second computing environment; and using the data storage schema to share data between the first group of users and the second group of users.

18 Claims, 6 Drawing Sheets

(56) References Cited

U.S. PATENT DOCUMENTS

2012/0143923 A1    6/2012    Whitney et al.
2013/0085989 A1*   4/2013    Nayyar ................ G06F 16/119
                                                                   707/610

\* cited by examiner

SECURE DATABASE WITH USER-DEFINED SCHEMAS

CROSS-REFERENCE TO RELATED APPLICATIONS

This application claims the benefit of U.S. Provisional Patent Application No. 63/183,910, filed May 4, 2021, the entire contents of which are incorporated by reference herein.

TECHNICAL FIELD

The following disclosure relates to systems and methods for secure data communications and, in certain examples, to secure communications between users of different organizations through the use of a secure database and user-defined schemas.

BACKGROUND

Users often communicate with each other over the Internet in an insecure manner. Insecure communications are acceptable for many purposes when the information communicated is of a non-sensitive nature; however, there are many contexts in which the information communicated is sensitive or confidential, such as communications related to business transactions, e-commerce, and the like. In such contexts, users should employ systems with cryptographic capabilities that can encrypt and decrypt the communicated information. This prevents intermediate parties—such as active eavesdroppers, or systems such as routers that make up the Internet architecture—from being able to obtain the communicated information in its original, unencrypted or clear form.

The cryptographic infrastructure needed to allow users to easily and transparently secure their communications can be complex. Delegation of cryptographic functionality entails a certain degree of trust of the infrastructure components that provide the functionality. Accordingly, a third-party organization providing the cryptographic functionality may be able to exploit this trust to obtain the original, unencrypted communications. Such a risk may not be acceptable to some users, e.g., when conducting highly sensitive communications.

Existing methods of exchanging data between different organizations include the use of spreadsheets (e.g., sent by email), online spreadsheet-like systems, and ad hoc end user database programs. Spreadsheets can allow for a certain amount of control over the format and structure of data but such controls can be easily modified by users, which can significantly disrupt the data exchange process. Databases can provide for a more formal schema (e.g., with fixed column definitions) that provides a greater level of control at the cost of considerable inflexibility. "NOSQL" databases have, in recent years, provided an alternative which dispenses with a formal schema, and such databases share many of the characteristics described for spreadsheets.

There is a need for improved methods of providing secure data communications, without compromising flexibility, structure, or access controls.

SUMMARY

In general, the systems and methods described herein can provide secure data communications between users from multiple organizations, such as different companies, businesses, educational entities, and/or governmental entities. Such users and organizations often have the need to exchange data that may be considered confidential or sensitive. The systems and methods allow the users and organizations to exchange data through the use of a secure database that stores data and a schema in encrypted form. The users and organizations can retrieve the data and schema from the database and use one or more encryption keys to decrypt the data and the schema. The encryption keys can be shared among the users and organizations who are exchanging the data, without permitting the encryption keys to be obtained by the database, a manager of the database, or third parties who may be able to eavesdrop on data transmissions between the users and organizations. Advantageously, by preventing such access to the encryption keys, the database, the database manager, and the third parties are unable to access the contents of the exchanged data and schema in a clear or unencrypted form. Further, the users and organizations exchanging the data can agree on a schema for the data and can keep the schema secret from other users, other organizations, the database, the database manager, and the third parties.

In some instances, for example, a first user of a first organization can define a schema for a dataset and add one or more records to the dataset according to the schema. An encryption key can be used to encrypt the schema and the records on one or more computers controlled by the first user or the first organization. The encrypted schema and records can be stored in a secure database (e.g., in a cloud storage infrastructure), and the encryption key can be shared with a second user from a second organization. One or more computers controlled by the second user or the second organization can then retrieve the encrypted schema and records from the secure database and use the encryption key to decrypt the schema and records. The records can be displayed for the second user, and the second user can use the schema to edit the records and/or create new records. Advantageously, the database, the manager of the database, and/or third parties who may have access to the data transmissions do not have access to the encryption key or are otherwise unable to decrypt or view the schema and records exchanged by the first and second users.

Further, by encrypting the schema in addition to the records, third parties are unable to use the schema to infer certain information related to the records. For example, if a schema is not encrypted and a third party is able to determine that the schema is called or relates to "Merger Proposal," then the third party could conclude that two corporations using the schema are discussing a merger. The third party in this case could perform traffic analysis or other triangulation techniques to monitor communications between the two corporations. Even though the records or messages being exchanged are encrypted in this example, the third party could at least determine whether the merger discussions are ongoing or have concluded. Accordingly, encrypting the schema in addition to the records, as described herein, provides far more security than encrypting only the records.

In one aspect, the subject matter of this disclosure relates to a computer-implemented method of sharing data. The method includes: providing a communication service to a first group of users from a first organization and a second group of users from a second organization, the first organization including a first computing environment, and the second organization including a second computing environment; creating a data storage schema on at least one computer from the first computing environment; encrypting the data storage schema using at least one encryption key on the at least one computer from the first computing environment; sending the encrypted data storage schema from the first computing environment to a cloud storage infrastructure associated with the communication service; receiving the encrypted data storage schema from the cloud storage infrastructure on at least one computer from the second computing environment; decrypting the data storage schema using the at least one encryption key on the at least one computer from the second computing environment; and using the data storage schema to share data between the first group of users and the second group of users.

In certain examples, the communication service can include a secure communication service for exchanging data between the first group of users and the second group of users. The first organization and the second organization can each be or include a separate company, corporation, partnership, business entity, educational entity, governmental entity, financial services entity, or research entity. Creating the data storage schema can include receiving a definition of a data storage schema from at least one user from the first group of users.

In some instances, the cloud storage infrastructure associated with the communication service does not have access to the at least one encryption key and is unable to decrypt the data storage schema. The cloud storage infrastructure associated with the communication service can include a database, such as, for example, an object database, an object-relational database, and/or a key-value database. Decrypting the data storage schema can include sending the at least one encryption key from the first computing environment to the second computing environment. Using the data storage schema can include displaying data from the cloud storage infrastructure using the data storage schema. Using the data storage schema can include creating a database record or editing a database record.

In another aspect, the subject matter of this disclosure relates to a system having one or more computer systems programmed to perform operations including: providing a communication service to a first group of users from a first organization and a second group of users from a second organization, the first organization including a first computing environment, and the second organization including a second computing environment; creating a data storage schema on at least one computer from the first computing environment; encrypting the data storage schema using at least one encryption key on the at least one computer from the first computing environment; sending the encrypted data storage schema from the first computing environment to a cloud storage infrastructure associated with the communication service; receiving the encrypted data storage schema from the cloud storage infrastructure on at least one computer from the second computing environment; decrypting the data storage schema using the at least one encryption key on the at least one computer from the second computing environment; and using the data storage schema to share data between the first group of users and the second group of users.

In some examples, the communication service can include a secure communication service for exchanging data between the first group of users and the second group of users. The first organization and the second organization can each be or include a separate company, corporation, partnership, business entity, educational entity, governmental entity, financial services entity, or research entity. Creating the data storage schema can include receiving a definition of a data storage schema from at least one user from the first group of users.

In certain implementations, the cloud storage infrastructure associated with the communication service does not have access to the at least one encryption key and is unable to decrypt the data storage schema. The cloud storage infrastructure associated with the communication service can include a database, such as, for example, an object database, an object-relational database, and/or a key-value database. Decrypting the data storage schema can include sending the at least one encryption key from the first computing environment to the second computing environment. Using the data storage schema can include displaying data from the cloud storage infrastructure using the data storage schema. Using the data storage schema can include creating a database record or editing a database record.

In another aspect, the subject matter of this disclosure relates to a non-transitory computer-readable medium having instructions stored thereon that, when executed by one or more computer processors, cause the one or more computer processors to perform operations including: providing a communication service to a first group of users from a first organization and a second group of users from a second organization, the first organization including a first computing environment, and the second organization including a second computing environment; creating a data storage schema on at least one computer from the first computing environment; encrypting the data storage schema using at least one encryption key on the at least one computer from the first computing environment; sending the encrypted data storage schema from the first computing environment to a cloud storage infrastructure associated with the communication service; receiving the encrypted data storage schema from the cloud storage infrastructure on at least one computer from the second computing environment; decrypting the data storage schema using the at least one encryption key on the at least one computer from the second computing environment; and using the data storage schema to share data between the first group of users and the second group of users.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, the systems and methods described herein allow end users to create, share, and collaborate on data in a manner that is both flexible enough to foster ad hoc usage and structured enough to constrain updates to a valid subset of all possible values (e.g., according to a shared schema). The systems and methods can enable secure data exchanges that are immediate and/or highly distributed. Use cases for the systems and methods can include, for example: a process of making compensation decisions during annual personnel reviews; negotiations of economic terms for financial transactions; and/or distributed processing of management data in large organizations.

Figure 1:
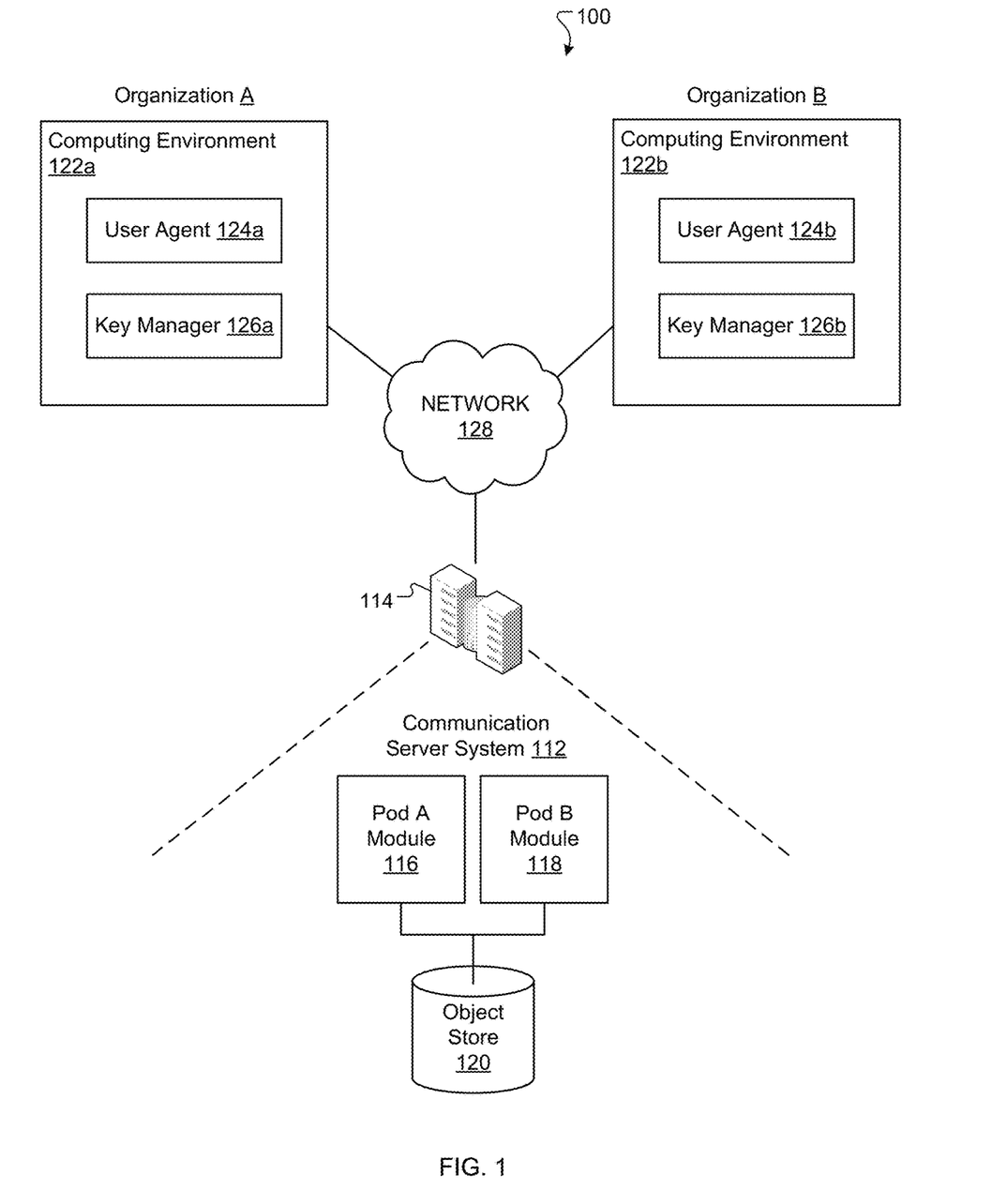
FIG. 1 is a schematic diagram of a system for providing secure communications among two or more organizations, according to an exemplary embodiment.

FIG. 1 illustrates an example system 100 that allows two or more organizations (e.g., separate companies) to securely store, access, and share data. A communication server system 112 provides functionality for secure data storage and secure communications among the organizations. In the depicted example, the system 100 includes two organizations, organization A and organization B; however, it is understood that any number of additional organizations can be included in or utilize the system 100.

The communication server system 112 includes software components and databases that can be deployed at one or more data centers 114 in one or more geographic locations, for example. The server system 112 software components can include a pod A module 116 for providing a secure communication service to organization A and a pod B module 118 for providing the secure communication service to organization B. The software components can include subcomponents that can execute on the same or on different individual processors or data processing apparatus. The communication server system 112 databases can include an object store 120 database for storing data that can be accessed and shared by organization A and organization B. The data can be stored in the object store 120 database in encrypted form and, in certain examples, the communication server system 112 and the object store 120 database are unable to decrypt the data. For example, the communication server system 112 and the object store 120 database may not have access to an encryption key required to decrypt the data stored in the object store 120 database. The object store 120 database can reside in one or more physical storage systems and/or can include or utilize a cloud storage infrastructure. The software components and data will be further described below.

In various examples, organization A and organization B can each be or include a separate organization, such as a company, a corporation, a partnership, a business, a governmental entity, an educational entity, a financial services entity, a research entity, or other type of entity or enterprise. Each organization can have or be associated with one or more people (e.g., employees) who utilize the system 100 (referred to herein as "users"). Organization A and organization B can each have or be associated with a computing environment 122a and 122b, respectively, that is accessible to users of the respective organization but inaccessible to users of the other organization. The computing environments 122a and 122b can each include one or more computers (e.g., user client devices and/or servers), software components, and networking equipment that facilitates communications within the computing environment.

The software components in the computing environments 122a and 122b can include, for example, a user agent 124a and 124b, respectively, and a key manager 126a and 126b, respectively. The user agents 124a and 124b can be used by users of the organizations to communicate and share data with other users, as described herein. In some examples, the user agents 124a and 124b can be or include a web-based application, a desktop application, a mobile application (e.g., installed on a smart phone or mobile device), other type of application, and/or may be installed locally within the computing environments 122a and 122b, respectively. The user agents 124a and 124b may be installed on computing devices that are owned or managed by the organizations and/or on computing devices that are owned or managed by users associated with the organizations (e.g., employees or consultants). The key managers 126a and 126b can provide and/or manage one or more encryption keys used to encrypt and/or decrypt data created, stored, accessed, and shared by the users. The key managers 126a and 126b can operate within the respective computing environments 122a and 122b, as depicted, and/or may be stored or operate on one or more computing devices on which the user agents 124a and 124b are installed. The users of each organization can share data and access the communication server system 112 using a network 128 (e.g., including the Internet).

In various examples, the system 100 can provide a secure database (e.g., the object store 120 database), which can be or include, for example, an object database, an object-relational database, and/or a key-value database. The secure database can be or utilize a cloud storage infrastructure that allows users to store and access data and/or partitions of the data (e.g., datasets). Such data can be encrypted on a user's computer (e.g., within the computing environment 122a or 122b) before transmission to the cloud storage infrastructure. Encryption can be performed using one or more encryption keys managed by the key managers 126a and 126b.

Additionally or alternatively, the system 100 provides a flexible schema capability that allows end users to describe a structure or format for data stored in the cloud storage infrastructure. The specified schema can be valid in a certain context and/or for one or more partitions of stored data. In some examples, schemas for the system 100 can be implemented using Open API 3.0 (e.g., available at https://www.openapis.org/). The system 100 can allow a user to describe a schema by defining a data structure (e.g., an object) that includes a number of fields or attributes. Each attribute can have a type definition (e.g., "string" or "number") and optional format and limit information (e.g., a 64-bit floating point number with a minimum value of −0.6 and a maximum value of $6 \times 10^{23}$). Such schemas can be nested to describe data structures of arbitrary complexity. In certain examples, schemas can be persisted as an OpenAPI 3.0 specification (a type of JSON document). Schemas can be created using the user agent 124a or 124b.

Having created a schema, the user can publish the schema to a registry (e.g., a dataset of schemas in the cloud storage infrastructure), which can be protected by an encryption key. In some instances, the system 100 allows the user to control access to the encryption key by adding and removing users to a data sharing or communication forum or session (e.g., a chat room). The data sharing session can include users from two or more organizations (e.g., including organization A and organization B), and schemas can be securely shared across organization boundaries as appropriate.

Once one or more schemas have been created by a user (or retrieved by the user from the cloud storage infrastructure), the user can create a dataset in the cloud storage infrastructure and can associate the dataset with the one or more schemas. Objects can then be added to the dataset, displayed, and/or edited, as desired. Existence of a schema can allow data to be formatted in an appropriate way for the type (e.g., domain) of data, so that a user interface (e.g., associated with the user agent 124a or 124b) can prevent insertion of letters in a number field or otherwise can ensure that data entered by a user is a proper format, consistent with the schema. In some scenarios, the user interface can display the data in a grid, for example, with one object per row and with each attribute displayed in a separate column, to provide the user with a spreadsheet or database type of experience. In other scenarios, the user interface can display the data in a one item per page format, to provide the user with a form type of experience.

In various examples, the schema registry can be a dataset in the cloud storage infrastructure, and schemas can be handled in the cloud storage infrastructure in the same or similar manner as other data. Advantageously, use of separate but linked schemas, an orthogonal data architecture of the cloud storage infrastructure, and/or the secure communications techniques described herein can make the system 100 both flexible and controlled, while preventing unauthorized access to the stored data.

Figure 2:
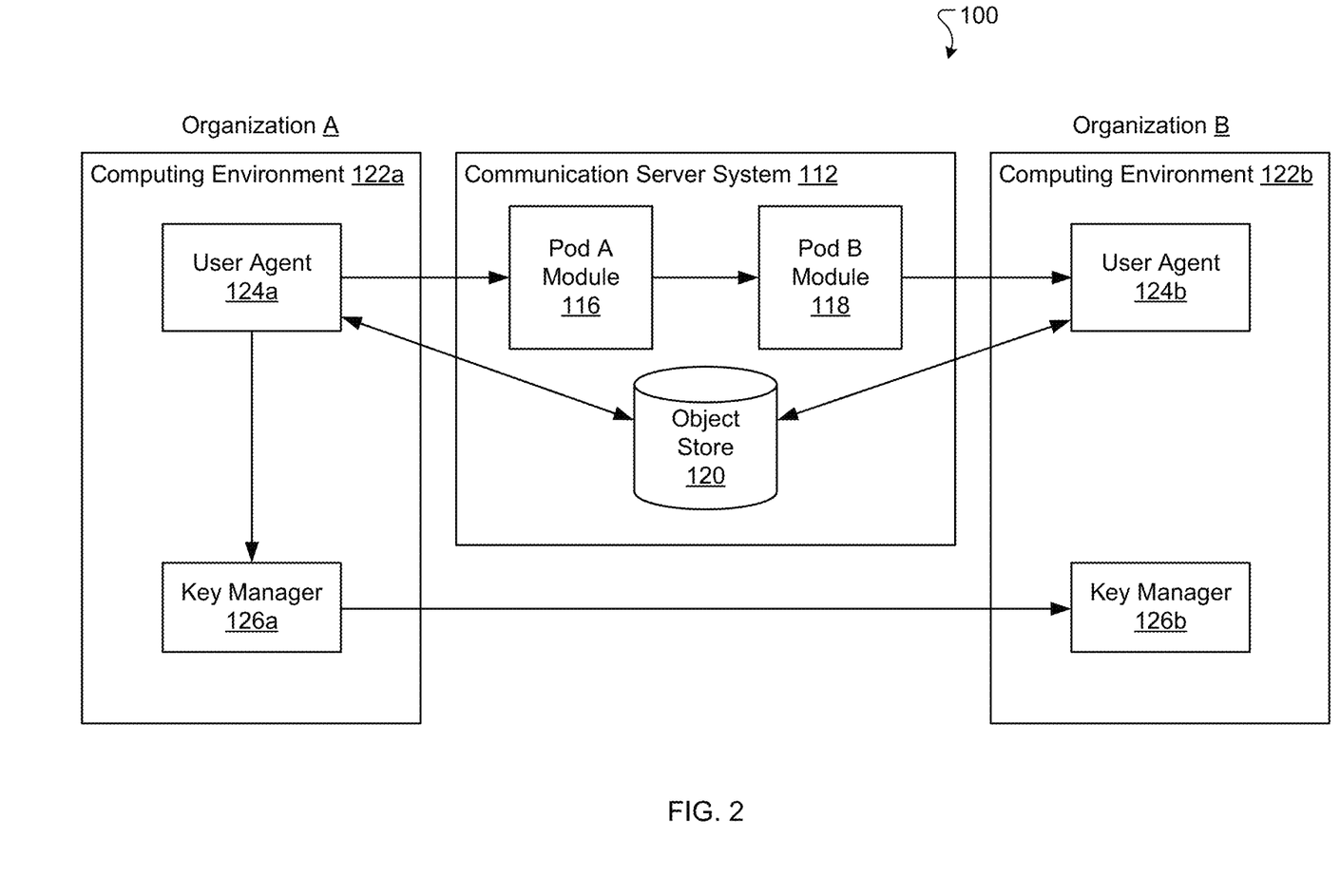
FIG. 2 is a schematic diagram of an information flow among components of the system of FIG. 1, according to an exemplary embodiment.

FIG. 2 is a schematic diagram of an information flow among components of the system 100, in accordance with certain embodiments. In the depicted example, two users (user A and user B, not shown) wish to exchange data securely. User A is an employee or member of organization A and User B is an employee or member of organization B. The two organizations A and B each have or are associated with a "pod," which can be or include an instance of a communication service or a communication platform, as described herein. For example, organization A can be associated with pod A (as implemented by the pod A module 116) and organization B can be associated with pod B (as implemented by the pod B module 118). The pods can be operated (e.g., in the cloud) on behalf of each organization. The pods can allow user A to exchange messages or share data with user B.

Additionally or alternatively, the key managers 126a and 126b for organizations A and B, respectively, may be operated by the organizations within their own, respective data centers (e.g., the computing environments 122a and 122b, respectively). Encryption keys can be generated and/or stored in the computing environments 122a and 122b, for example, using the key managers 126a and 126b. In various implementations, the encryption keys and data (e.g., clear text or unencrypted customer data) can exist in the computing environments 122a and 122b in unencrypted form; however, all data can be or is encrypted before the data is transmitted to the cloud storage infrastructure. Such encryption can ensure that a manager of the cloud storage infrastructure (or other entities who may have access to the cloud storage infrastructure) has access only to encrypted data and is unable to view the data in a clear, unencrypted form and therefore has no visibility into content of the data. The key managers 126a and 126b are able to share encryption keys with one another, without providing the communication server system 112 with access to such keys. Such sharing of encryption keys can be performed using the Diffie-Hellman algorithm or other suitable technique. Additionally or alternatively, if two parties each have an asymmetric key pair (e.g., a matching pair of "private" and "public" keys) and have a reliable way of knowing each other's public key, then one party can exchange a shared secret key by encrypting the secret key using the other party's public key and then sending the encrypted secret key to the other party. In various examples, wrapped or encrypted keys and other data can be exchanged between the two parties using the communication server system 112, which may be or include shared cloud services.

User A and user B in this example can interact with the user agent 124a and 124b, respectively. The user agent 124a and 124b can be a desktop application (e.g., provided by SYMPHONY COMMUNICATION SERVICES, LLC), an extension application hosted within the desktop application, a chat application, and/or a standalone chatbot application, which may have a user interface and/or may operate on data received autonomously. The object store 120 database can be or include a cloud data storage infrastructure operated by a manager of the systems and methods described herein. Data in the object store 120 database can be encrypted using a content encryption key known to organization A and organization B but not known to the manager. In some examples, objects in the object store can be identified by a hash (e.g., generated using a cryptographic hash function) of the objects' contents. Each object can be a part of a single partition or dataset in the object store 120 database. In certain instances, users can retrieve an object (e.g., from the object store 120 database) using a hash identifier for the object, or can retrieve all objects in a partition using a hash identifier for the partition.

Figure 3:
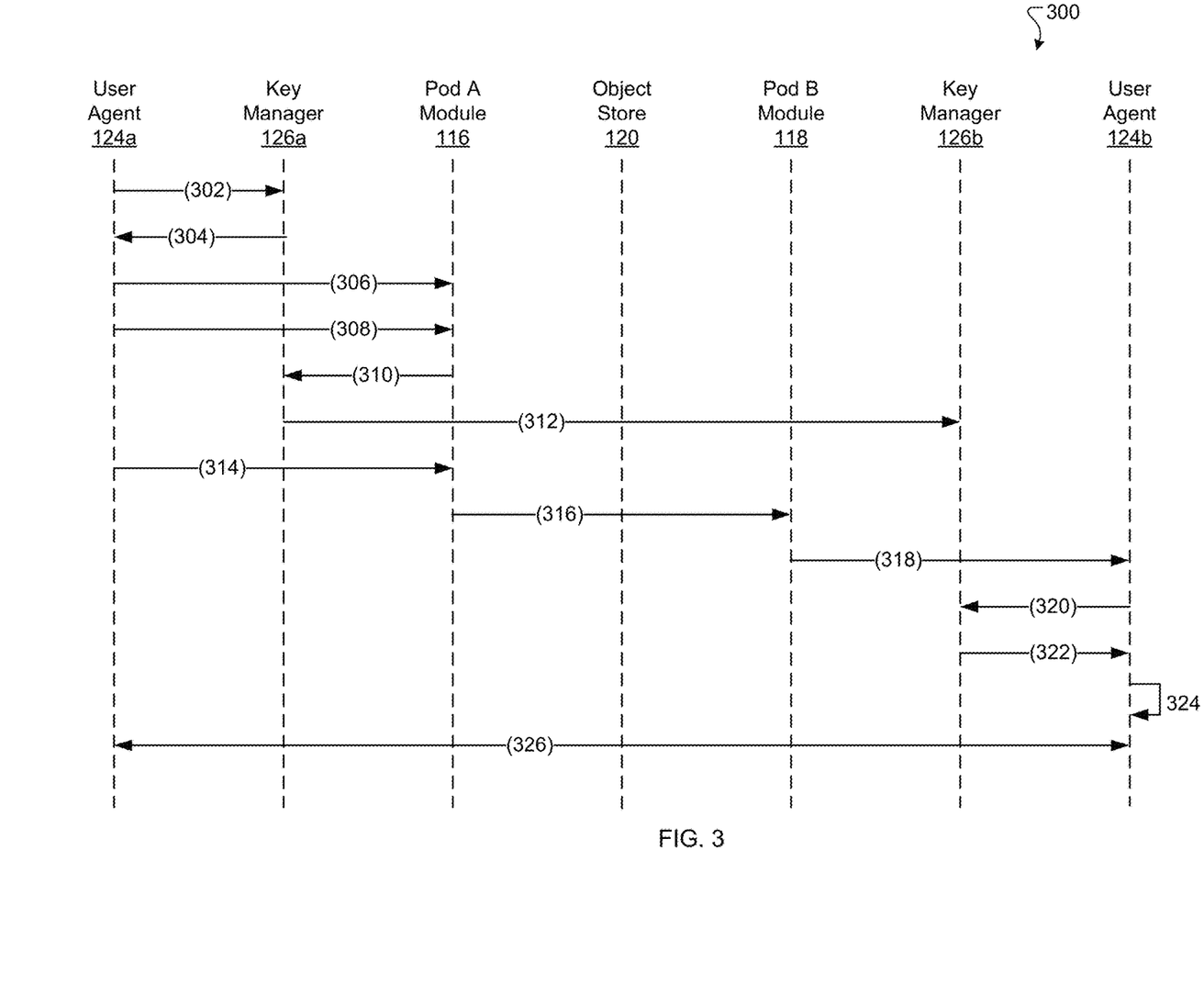
FIG. 3 is a sequence diagram of a method of establishing a secure communication session between two users from two different organizations, according to an exemplary embodiment.

FIG. 3 is a sequence diagram of an example method 300 of establishing a secure communication session between user A and user B of organization A and organization B, respectively. The method 300 begins when user A submits a request to create a multi-company chat room. In response, the user agent 124a makes (step 302) a request to the key manager 126a to generate a content encryption key for the chat room. The key manager provides (step 304) the content encryption key to the user agent 124a, and the user agent 124a creates (step 306) the chat room. In response to a request from user A, the user agent 124a adds (step 308) user B to the chat room, and the pod A module 116 makes (step 310) a request to the key manager 126a to share the content encryption key with the key manager 126b. The key manager 126a then shares (step 312) the content encryption key with the key manager 126b.

Next, user A uses the user agent 124a to send a message in the chat room indicating that the user wishes to exchange data with user B. The user agent 124a sends (step 314) the encrypted message to the pod A module 116, which forwards (step 316) the message to the pod B module 118, which delivers (step 318) the message to the user agent 124b. The user agent 124b then requests (step 320) the content encryption key from the key manager 126b, and the key manager 126b provides (step 322) the content encryption key to the user agent 124b. The user agent 124b uses the content encryption key to decrypt and display (step 324) the message for user B. Finally, user A and user B can use the user agents 124a and 124b to exchange (step 326) chat messages and agree to exchange certain data. For example, to send a message (or data) from user B to user A, the user agent 124b can send the message to the pod B module 118, which can forward the message to the pod A module 116, which can deliver the message to the user agent 124a. The user agent 124a can use the content encryption key to decrypt and display the message for user A. Messages or data exchanged between users A and B can be encrypted with the content encryption key, which is known to both of the user agents 124a and 124b.

Figure 4:
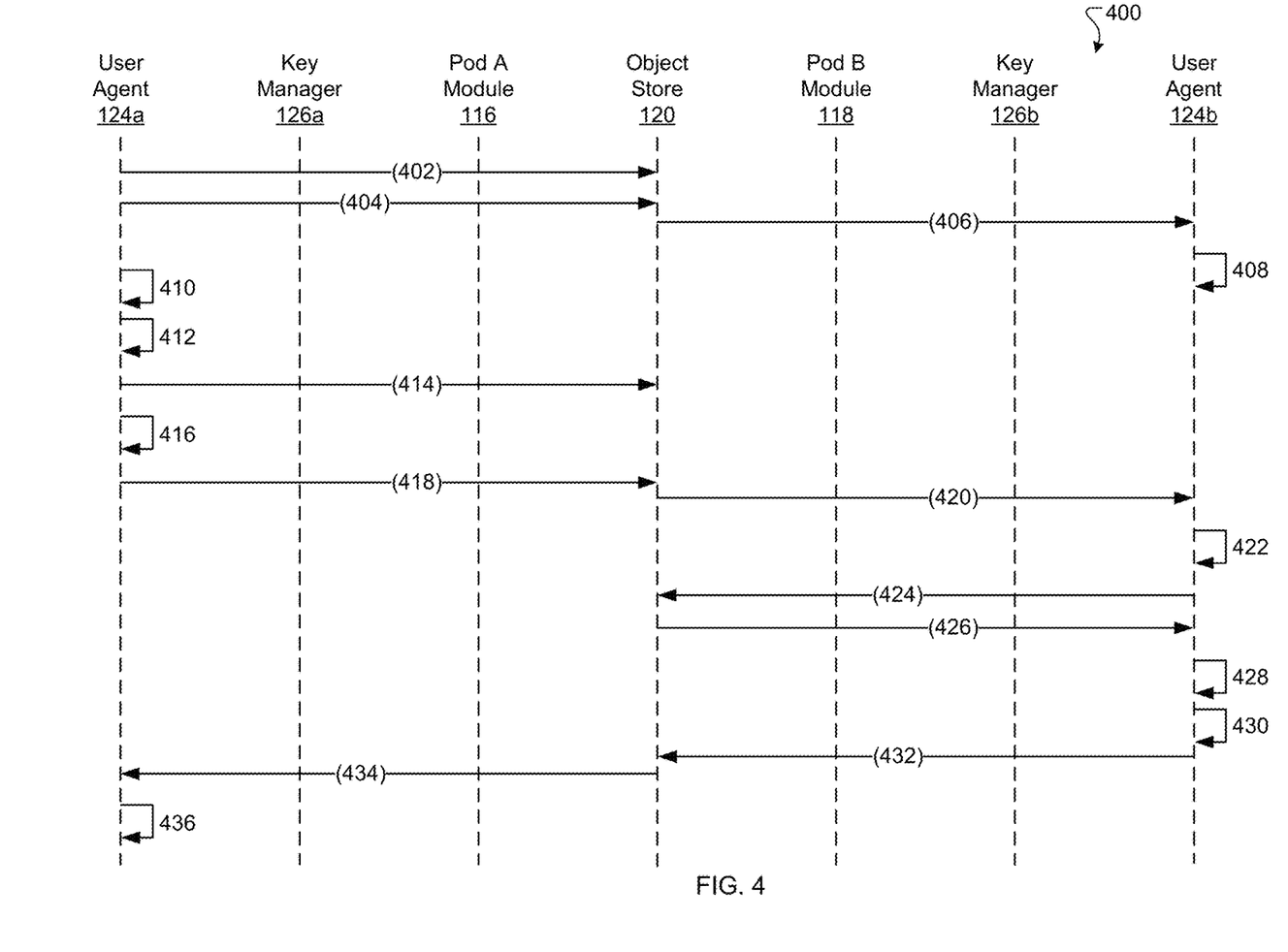
FIG. 4 is a sequence diagram of a method of exchanging data between two users from two different organizations, according to an exemplary embodiment.

FIG. 4 is a sequence diagram of an example method 400 of exchanging data between user A and user B of organization A and organization B, respectively. The method 400 can begin after a communication session has been established and user A and user B have agreed to exchange data (e.g., as described above for method 300). In response to a request from user A, the user agent 124a makes (step 402) a request to the object store 120 to create a partition of data (e.g., a dataset in the object store 120) and adds (step 404) user B as a user of the partition. The object store 120 creates the partition and sends (step 406) a notification to the user agent 124b indicating that user B is a user of the partition. The user agent 124b can display (step 408) the partition (or a representation of the partition) for user B in a list of available partitions. User B can select or click on the partition and see an empty list of records, given that the new partition is currently empty.

Next, in response to input from user A, the user agent 124a creates (step 410) a schema for the partition and/or data to be exchanged. This can be done by creating fields or attributes and assigning a data type to each attribute. For example, a "name" attribute can be a string of maximum length 40 characters, and an "age" attribute can be an integer having a minimum value of zero. In certain examples, user A and user B can agree on a schema that will be used for the partition. The user agent 124a can generate the schema or a document for the schema using the Open API 3.0 format or other desired format that can define schemas and/or other interface artefacts. In some implementations, user A can copy an Open API schema (or other schema) from a source (e.g., an existing schema) and input the copied schema directly into the user agent 124a. Once the schema information has been provided to the user agent 124a, the user agent 124a can encrypt (step 412) the schema and make (step 414) a request to the object store 120 to register the encrypted schema as being used by the partition. The schema can be identified by a hash of its contents. The schema and/or the partition can be stored as one or more encrypted objects.

User A can then use the user agent 124a to add a record to the partition. In some examples, the user agent 124a can present user A with a form containing fields for each attribute defined in the schema, and user A can use the form to enter the new record. The form can provide editing support based on the schema already assigned to the partition. Once user A saves the new record, the user agent 124a can encrypt (step 416) the contents of the record with the content encryption key, which is already available to the user agent 124a (e.g., from the key manager 126a). The user agent 124a can then make (step 418) a request to the object store 120 to store the encrypted record.

Next, the object store 120 sends (step 420) an update notification to inform the user agent 124b that the new record is available. In some examples, the update notification can include the encrypted record, and the user agent 124b can extract the encrypted record from the update notification. In other examples, the user agent 124b can retrieve the record from the object store 120. For example, the update notification may provide an identifier (e.g., a hash identifier) or location information for the new record, and the user agent 124 can make a request to the object store 120 to retrieve the encrypted record. Retrieval from the object store 120 may be necessary when an event notification mechanism limits the size of a message and/or the update notification is otherwise unable to include the encrypted record. Once the user agent 124b has obtained the encrypted record, the user agent 124b can decrypt (step 422) the record with the content encryption key, which is already available to the user agent 124b (e.g., from the key manager 126b). In some examples, the user agent 124b can display the record to user B; however, without having possession of the schema, the user agent 124b may be unable to display the record in a proper format and/or the displayed record may be missing important information. For example, if a number attribute is defined within the schema to be a US$ currency amount, then knowledge of the schema can allow the value 1234.5 to be properly displayed as $1,234.50. Accordingly, in some instances, it can be better to require the user agent 124b to validate or have possession of the schema before the record is displayed for user B.

To enable user B to view the record (e.g., in a proper format), update the record, or add a new record, the user agent 124b can request (step 424) the encrypted schema from the object store 120, and the object store 120 can send (step 426) the encrypted schema to the user agent 124b. The user agent 124b can decrypt (step 428) the schema (e.g., using the content encryption key) so that the user agent 124b can utilize the schema and/or user B can understand the schema and associated data formats. User B can then use the user agent 124b to view the record, update the record, and/or create a new record for the partition. The user agent 124b can encrypt (step 430) the updated record and/or the new record and send (step 432) the encrypted information (including the updated record and/or the new record) to the object store 120, which can store the information in encrypted form. The object store 120 can then send (step 434) an update notification to inform the user agent 124a about the availability of the information added to the partition by user B, including the updated record and/or the new record. The user agent 124a can obtain the encrypted information from the update notification and/or from the object store 120. Once obtained, the user agent 124a can use the content encryption key to decrypt (step 436) the updated record, the new record, and/or other information in the partition. The user agent 124a can then display the updated record and/or the new record for user A. One or more of the preceding steps can be repeated, as desired, with users A and B updating or creating records and the other user immediately seeing the effects of those updates, as described above.

In some examples, user A or user B may define a plurality of different schemas and associate the schemas with the same partition. Each time a record is created, the user creating the record may select any of the available schemas to define a structure of the record, which may be or include an object.

In certain implementations, when an encrypted record is transferred to a user agent 124a or 124b, the record can include a hash of the schema that defines the record or object. This can allow the user agent 124a or 124b to identify the schema associated with the record and/or to retrieve the schema from the object store 120, if needed. Advantageously, given that the cloud storage infrastructure does not have access to the content encryption key or is otherwise unable to view the contents of the record or the schema, no information from the encrypted record or schema is leaked to the cloud storage infrastructure when records are exchanged between the user agents and/or the object store. This can prevent a manager of the cloud storage infrastructure (or a third party who may be eavesdropping on the exchange of data) from being able to access the records or schema in unencrypted form.

In various examples, the schemas described herein can define the shape or format of data that is allowed for a dataset, object, or partition. For example, a dataset for an employee review process can be created that indicates each item in the dataset has the following fields or attributes: (i) Name, which must be a string of maximum length 35 characters; (ii) Rating, which must be a string and is limited to "EXCEEDS," "MEETS," or "NEEDS IMPROVEMENT"; (iii) Proposed Bonus %, which must be an integer in the range 0-100; and (iv) Comments, which can be a string of unbounded length. In some examples, when a user is granted access to create objects in the dataset, as described herein, the user can click an "Insert" button in a user interface (e.g., provided by a user agent), and the user interface can provide a form with the four fields described above. The Rating field can have a drop-down containing only the three allowed values, and the Proposed Bonus % field can allow the user to enter only numerals and at most three digits. For example, if a number greater than 100 is entered for Proposed Bonus %, the user may be prevented from saving the entered number (e.g., a "save" button may be greyed out). In general, the user can add any desired items to the dataset, as long as the schema constraints are satisfied (e.g., no letters in the Proposed Bonus % field and no number greater than 100 in that field).

Additionally or alternatively, objects in the object store (e.g., the object store 120 database) can be immutable; however, new versions of a logical object can be created. For example, a user can add a row having the following fields, "Joe", "MEETS", 20, "Not very good", and the row can be assigned object ID 1. The user (or a different user) can later update the row by entering "Joe", "NEEDS IMPROVEMENT", 0, "Actually quite awful", and the updated row can be assigned object ID 2. Both rows or objects may still exist, so a user can ask the object store for physical object 1 or physical object 2 and get back either version. Alternatively or additionally, the user can ask the object store to provide the current version of logical object 1 and the object store can provide the latest version, which is physical object 2 in this example. The object store can automatically provide a full history of all values of the object.

In various examples, the object store and/or a user agent can allow a user to create a partition, which can be or include a group of objects. For example, a user can create an object and assign a partition ID and a sort key to the object. The partition ID can identify the partition the object is a member of, and the sort key can identify where in that partition the object appears. The partition can contain the latest version of each logical object.

Additionally or alternatively, when a user creates a partition or dataset, the user can define or assign any suitable schema for the dataset. Each dataset can have its own schema, depending on the use case. In some examples, a user can use the systems and methods described herein to search for a dataset or partition name and then receive a display all the objects in that dataset. A browser can be used to list all the datasets created by or accessible to the user. The user can identify some datasets as being favorites, and such datasets can be prioritized in the display.

In various examples, a schema and its associated dataset can be stored in the cloud storage infrastructure but are fully encrypted and not visible to a manager of the cloud storage infrastructure. Advantageously, the user agents described herein can enforce the schema so that users and/or user client devices are required to comply with the schema. It a typical implementation, it is not be possible for a user to "break the schema" without hacking client software or accessing server APIs directly. Users can grant access to the schema and dataset to other users. As described herein, when a user creates or updates an object, a feed mechanism can push the updates to other users in real time. This can be used to implement a dynamic (e.g., grid-based) user interface that allows users to create and edit records online while achieving real-time collaboration with other users.

In various examples, the systems and methods described herein can provide a secure database (e.g., a generalized key-value store) for data encrypted with content encryption keys associated with and/or managed by separate organizations. Access to the object store can be provided by an application programming interface (API). The object store can provide an encrypted key-value store for which content is encrypted with content encryption keys. The keys can be used to encrypt chat messages and other data, and each object can be associated with a thread or conversation ID, which can define the encryption key used to protect the content.

In some instances, the object store provides create, read, update, and delete (CRUD) operations, with updates being implicitly transactional and protected by optimistic locking. The object store can provide a feed mechanism that allows a user to receive notifications when objects are created or updated on an at least once guaranteed delivery basis.

Object store permissions can be defined that allow the owner of a dataset to control which users have physical access to the data. To read the data, a user can require access to the encryption keys, and such access can be managed by a chat room membership mechanism.

In various implementations, the communication service and/or object store described herein can be a multi-tenant service and can be implemented using, for example, AWS managed services. Primary persistence can be provided by DYNAMODB, secondary persistence can be provided by S3. The service can be exposed as a set of REST endpoints which can be implemented as Lambda functions accessed via an AWS API Gateway. Feed processing can be performed by a separate Lambda function which can be configured as a DYNAMODB stream listener. This can maintain transaction capabilities of both the insert/update operation itself, and the end-to-end business transaction, including generation of feed notifications.

Hashes can be central to the data structures described herein and can require special treatment. Hash algorithms used for naming objects and/or schemas can follow rules that are hard coded by the architecture. Wherever a hash is required, the hash can be encoded in such a way that the algorithm used is identifiable from the encoding, which can ensure that collisions do not occur between hashes using different algorithms.

To allow binary hash values to act as effective keys, the hash type value can be encoded as a suffix to the raw hash value. This is in contrast to using a prefix value, given that the effectiveness of a value as a database key can be dependent on key values being well distributed across a value space. If the first part of most key values is the same, this can make storage and retrieval of the data inefficient in some implementations.

Figure 5:
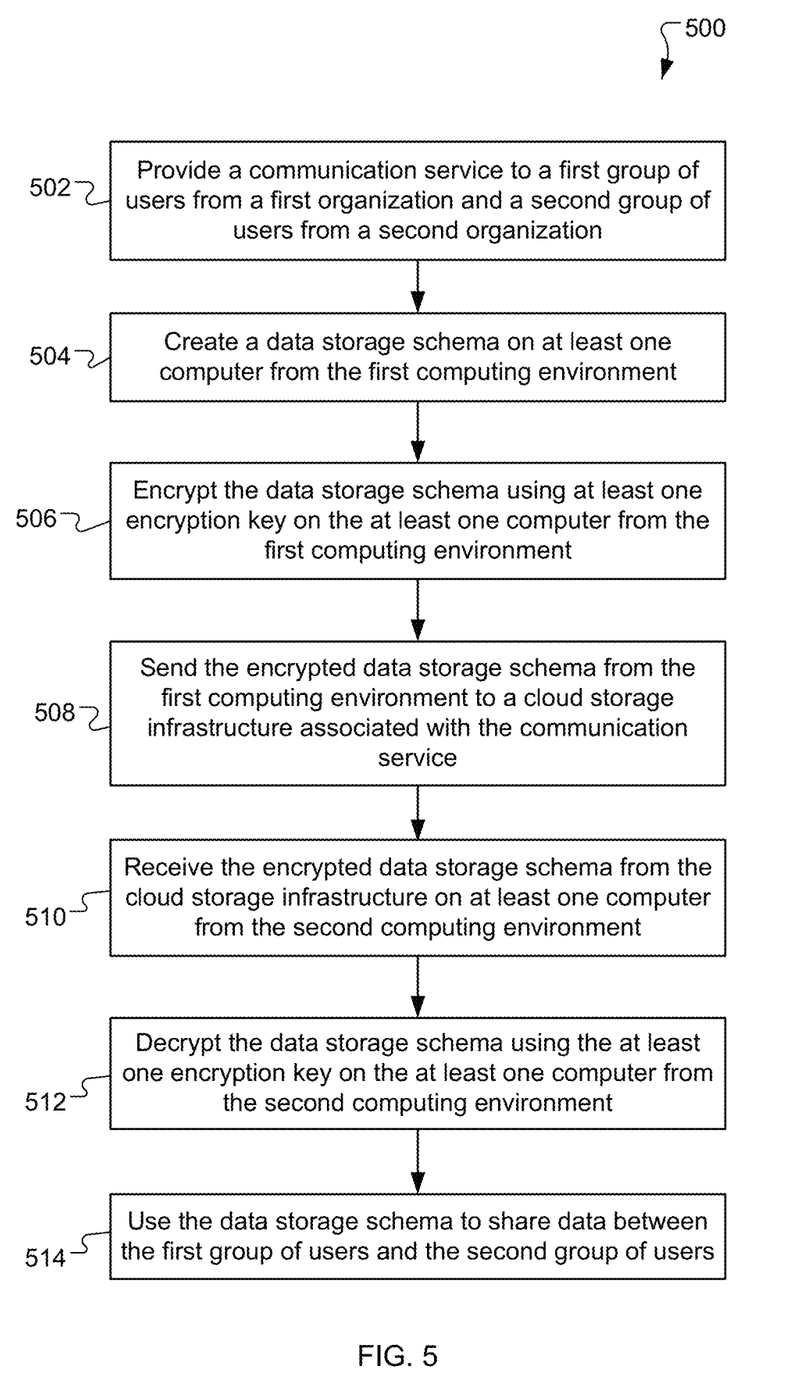
FIG. 5 is a flowchart of a method of exchanging data among users from different organizations, according to an exemplary embodiment.

FIG. 5 is a flowchart of an example method 500 of sharing or exchanging data among users of different organizations. A communication service is provided (step 502) to a first group of users from a first organization and a second group of users from a second organization. The first organization has or is associated with a first computing environment, and the second organization has or is associated with a second computing environment. A data storage schema is created (step 504) on at least one computer from the first computing environment. The data storage schema is encrypted (step 506) using at least one encryption key on the at least one computer from the first computing environment. The encrypted data storage schema is sent (step 508) from the first computing environment to a cloud storage infrastructure associated with the communication service. The encrypted data storage schema is received (step 510) from the cloud storage infrastructure on at least one computer from the second computing environment. The data storage schema is decrypted (step 512) using the at least one encryption key on the at least one computer from the second computing environment. The data storage schema is used (step 514) to share data between the first group of users and the second group of users.

Certain systems and methods for providing secure communications are described in U.S. Pat. No. 10,432,589, "Secure End-to-End Communications," issued Oct. 1, 2019, and in U.S. Pat. No. 10,237,246, "Secure Message Search," issued Mar. 19, 2019, the entire disclosures of which are incorporated by reference and form part of this written description.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 6:
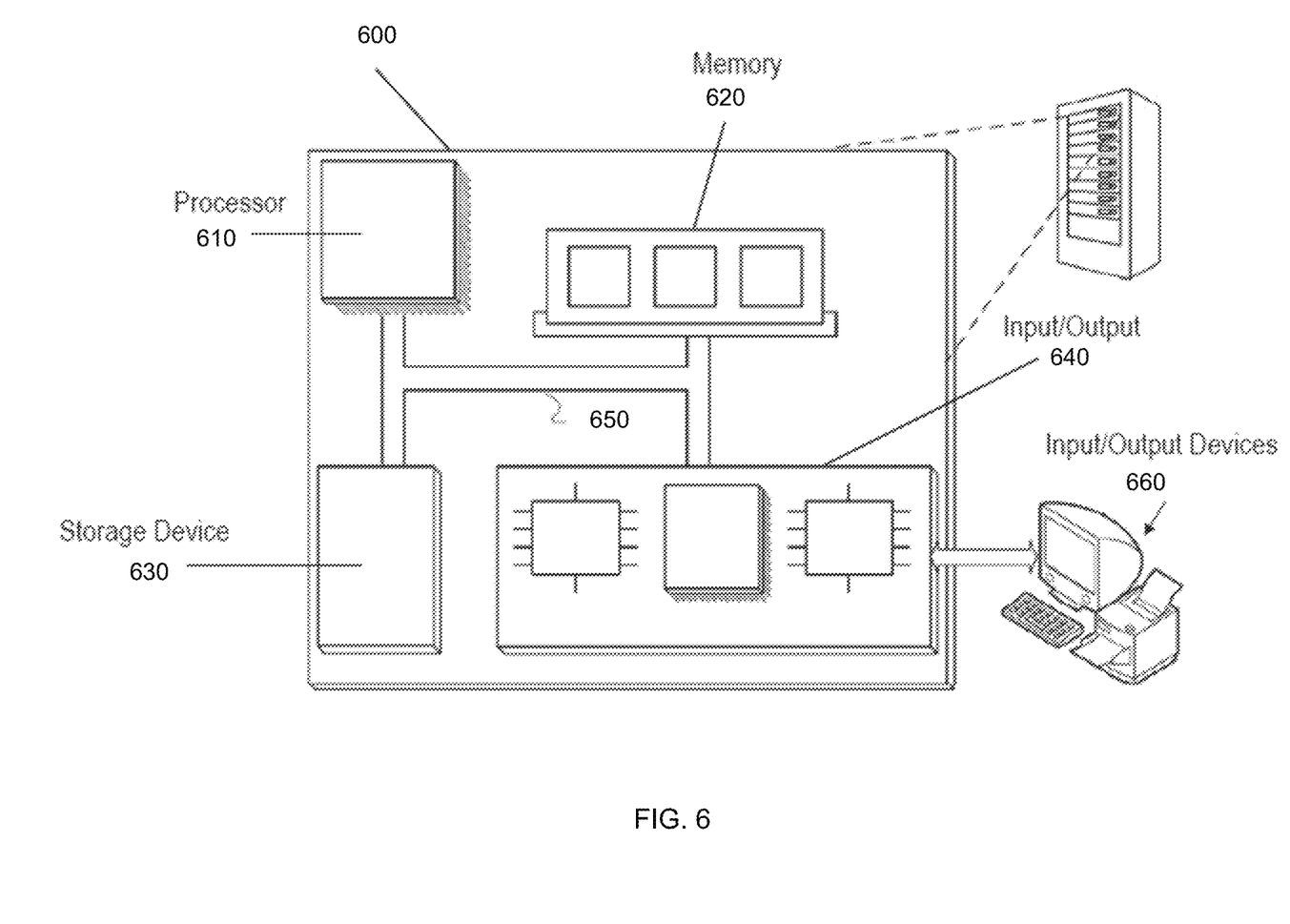
FIG. 6 is a block diagram of an example computer system, according to an exemplary embodiment.

FIG. 6 is a block diagram of an example computer system 600 that may be used in implementing the technology described herein. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-state drive, a flash drive, or some other large capacity storage device. For example, the storage device may store long-term data (e.g., database data, file system data, etc.). The input/output device 640 provides input/output operations for the system 600. In some implementations, the input/output device 640 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method of sharing data, the method comprising:
  obtaining access to a communication service provided to a first group of users from a first organization and a second group of users from a second organization, the communication service comprising a chatroom accessible to the first group of users and the second group of users, the first organization comprising a first computing environment, and the second organization comprising a second computing environment;

creating a data storage schema on at least one computer from the first computing environment;

encrypting the data storage schema using at least one encryption key on the at least one computer from the first computing environment;

sending the encrypted data storage schema from the first computing environment to a cloud storage infrastructure associated with the communication service,
wherein at least one computer from the second computing environment receives the encrypted data storage schema from the cloud storage infrastructure, and
wherein the at least one computer from the second computing environment decrypts the data storage schema using the at least one encryption key; and using the data storage schema to share data between the first group of users and the second group of users through the communication service,
wherein using the data storage schema comprises creating a database record or editing a database record.

2. The method of claim 1, wherein the communication service comprises a secure communication service for exchanging data between the first group of users and the second group of users.

3. The method of claim 1, wherein the first organization and the second organization each comprise a separate company, corporation, partnership, business entity, educational entity, governmental entity, financial services entity, or research entity.

4. The method of claim 1, wherein creating the data storage schema comprises receiving a definition of a data storage schema from at least one user from the first group of users.

5. The method of claim 1, wherein the cloud storage infrastructure associated with the communication service does not have access to the at least one encryption key and is unable to decrypt the data storage schema.

6. The method of claim 1, wherein the cloud storage infrastructure associated with the communication service comprises at least one of an object database, an object-relational database, or a key-value database.

7. The method of claim 1, wherein sending the encrypted data storage schema further comprises sending the at least one encryption key from the first computing environment to the second computing environment.

8. The method of claim 1, wherein using the data storage schema comprises displaying data from the cloud storage infrastructure using the data storage schema.

9. The method of claim 1, wherein at least one computer from the second computing environment is used to define the data storage schema, and wherein the data storage schema defines a data structure.

10. A system comprising:
one or more computer systems programmed to perform operations comprising:
obtaining access to a communication service provided to a first group of users from a first organization and a second group of users from a second organization, the communication service comprising a chatroom accessible to the first group of users and the second group of users, the first organization comprising a first computing environment, and the second organization comprising a second computing environment;

creating a data storage schema on at least one computer from the first computing environment;

encrypting the data storage schema using at least one encryption key on the at least one computer from the first computing environment;

sending the encrypted data storage schema from the first computing environment to a cloud storage infrastructure associated with the communication service,
wherein at least one computer from the second computing environment receives the encrypted data storage schema from the cloud storage infrastructure, and
wherein the at least one computer from the second computing environment decrypts the data storage schema using the at least one encryption key; and using the data storage schema to share data between the first group of users and the second group of users through the communication service,
wherein using the data storage schema comprises creating a database record or editing a database record.

11. The system of claim 10, wherein the communication service comprises a secure communication service for exchanging data between the first group of users and the second group of users.

12. The system of claim 10, wherein the first organization and the second organization each comprise a separate company, corporation, partnership, business entity, educational entity, governmental entity, financial services entity, or research entity.

13. The system of claim 10, wherein creating the data storage schema comprises receiving a definition of a data storage schema from at least one user from the first group of users.

14. The system of claim 10, wherein the cloud storage infrastructure associated with the communication service does not have access to the at least one encryption key and is unable to decrypt the data storage schema.

15. The system of claim 10, wherein the cloud storage infrastructure associated with the communication service comprises at least one of an object database, an object-relational database, or a key-value database.

16. The system of claim 10, wherein sending the encrypted data storage schema further comprises sending the at least one encryption key from the first computing environment to the second computing environment.

17. The system of claim 10, wherein using the data storage schema comprises displaying data from the cloud storage infrastructure using the data storage schema.

18. A non-transitory computer-readable medium having instructions stored thereon that, when executed by one or more computer processors, cause the one or more computer processors to perform operations comprising:
obtaining access to a communication service provided to a first group of users from a first organization and a second group of users from a second organization, the communication service comprising a chatroom accessible to the first group of users and the second group of users, the first organization comprising a first computing environment, and the second organization comprising a second computing environment;

creating a data storage schema on at least one computer from the first computing environment;

encrypting the data storage schema using at least one encryption key on the at least one computer from the first computing environment;

sending the encrypted data storage schema from the first computing environment to a cloud storage infrastructure associated with the communication service, wherein at least one computer from the second computing environment receives the encrypted data storage schema from the cloud storage infrastructure, and wherein the at least one computer from the second computing environment decrypts the data storage schema using the at least one encryption key; and using the data storage schema to share data between the first group of users and the second group of users through the communication service, wherein using the data storage schema comprises creating a database record or editing a database record.

* * * * *